United States Patent [19]
Murayama et al.

[11] 3,887,517
[45] June 3, 1975

[54] PIPERIDINE DERIVATIVES AND THEIR USE AS STABILIZERS

[75] Inventors: Keisuke Murayama; Katsuaki Matsui; Tomoyuki Kurumada, all of Tokyo, Japan

[73] Assignee: Sankyo Co., Ltd., Japan

[22] Filed: Oct. 9, 1973

[21] Appl. No.: 404,147

[30] Foreign Application Priority Data
Oct. 25, 1972 Japan.............................. 47-106796

[52] U.S. Cl. 260/45.8 N; 260/45.7 PH; 260/45.8 SN; 260/45.8 NZ; 260/45.85 R; 260/45.85 T; 260/45.85 S; 260/45.95 R; 260/45.95 C; 260/45.95 E
[51] Int. Cl. ............................................ C08f 45/58
[58] Field of Search ................................ 260/45.8 N

[56] References Cited
UNITED STATES PATENTS

| | | | |
|---|---|---|---|
| 3,431,232 | 3/1969 | Murayama et al............. | 260/45.8 N |
| 3,480,635 | 11/1969 | Altwicker ...................... | 260/45.8 N |
| 3,503,982 | 3/1970 | Murayama et al............. | 260/45.8 N |
| 3,640,928 | 2/1972 | Murayama et al............. | 260/45.8 N |
| 3,684,765 | 8/1972 | Matsui et al................... | 260/45.8 N |
| 3,705,166 | 12/1972 | Murayama et al............. | 260/45.8 N |

*Primary Examiner*—Melvyn I. Marquis
*Attorney, Agent, or Firm*—Toren, McGeady and Stanger

[57] ABSTRACT

Piperidine derivatives having the formula

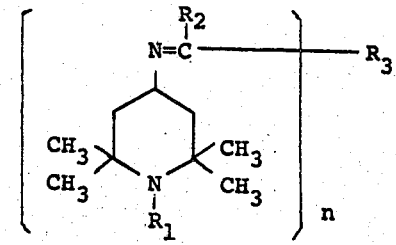

The compounds are useful as stabilizers against photo- and thermal-deterioration of various synthetic polymers.

17 Claims, No Drawings

PIPERIDINE DERIVATIVES AND THEIR USE AS STABILIZERS

This invention relates to new piperidine derivatives and their use as stabilizers for synthetic polymers.

More particularly, it is concerned with a piperidine derivative having the formula

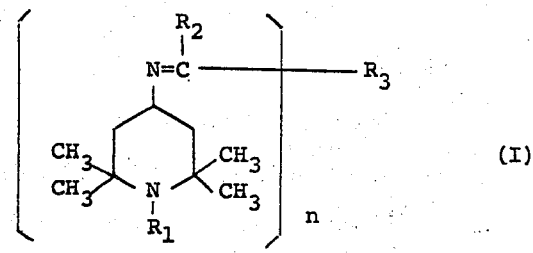

wherein $R_1$ represents hydrogen atom; an alkyl group having 1-4 carbon atoms which may be optionally substituted with hydroxy, alkoxy having 1-4 carbon atoms, phenoxy, aliphatic acyloxy having 2-18 carbon atoms, aromatic acyloxy having 7-11 carbon atoms, halogen, cyano, epoxy, alkoxycarbonyl having 1-4 carbon atoms in the alkoxy moiety or phenoxycarbonyl; an alkenyl group having 3-4 carbon atoms; an alkynyl group having 3-4 carbon atoms; benzyl group; an aliphatic acyl group having 2-4 carbon atoms; an alkoxycarbonyl group having 2-9 carbon atoms or a phenylalkoxycarbonyl group having 1-4 carbon atoms in the alkoxy moiety; $n$ is 1 or 2 and, when $n$ is 1, $R_2$ represents hydrogen atom; an alkyl group having 1-4 carbon atoms; a phenylalkyl group having 1-4 carbon atoms in the alkyl moiety; or an aryl group which may be optionally substituted with halogen, hydroxy, nitro, alkyl having 1-4 carbon atoms, alkoxy having 1-4 carbon atoms or alkali metal sulfo; and $R_3$ represents an alkyl group having 1-18 carbon atoms; a halogenoalkyl group having 1-4 carbon atoms; an alkenyl group having 2-4 carbon atoms; an alkynyl group having 2-4 carbon atoms; a phenylalkyl group having 1-4 carbon atoms in the alkyl moiety; styryl group; an aryl group which may be optionally substituted with halogen, hydroxy, nitro, alkyl having 1-4 carbon atoms, alkoxy having 1-4 carbon atoms, alkali metal sulfo; a heterocyclic group; or $R_3$ and $R_2$, together with the carbon atom to which they are attached, represent a cycloalkylidene group having 4-6 carbon atoms and, when n is 2, $R_2$ represents hydrogen atom and $R_3$ represents an alkylene group having 2-6 carbon atoms; or phenylene; or the carbon atoms, each of which is linked to $R_3$, are directly bonded.

Also, it is concerned with synthetic polymer composition stabilized against photo- and thermal-deterioration wherein there is incorporated the piperidine derivative having the above formula (I) in a sufficient amount to prevent such deterioration.

In the present invention, preferable compounds are those having the formula (I) wherein $R_1$ represents hydrogen atom or an alkyl group having 1-4 carbon atoms, $n$ is 1 or 2 and, when $n$ is 1, $R_2$ represents hydrogen atom, an alkyl group having 1-4 carbon atoms, a phenylalkyl group having 1-4 carbon atoms in the alkyl moiety or phenyl group and $R_3$ represents an alkyl group having 1-18 carbon atoms, an alkenyl group having 2-4 carbon atoms, a phenyalkyl group having 1-4 carbon atoms in the alkyl moiety, styryl group, a phenyl or naphthyl group which may be optionally substituted with halogen, hydroxy, nitro or alkali metal sulfo or 2-furyl group and, when $n$ is 2, $R_2$ represents hydrogen atom and the carbon atoms, each of which is linked to $R_3$, are directly bonded.

Most preferable compounds of this invention are those having the formula (I) wherein $R_1$ represents hydrogen atom or methyl group, and when $n$ is 1, $R_2$ represents hydrogen atom, an alkyl group having 1-4 carbon atoms, a phenylalkyl group having 1-4 carbon atoms in the alkyl moiety or phenyl group and $R_3$ represents an alkyl group having 1-18 carbon atoms, an alkenyl group having 2-4 carbon atoms, a phenylalkyl group having 1-4 carbon atoms in the alkyl moiety, styryl group, a phenyl or naphthyl group which may be optionally substituted with halogen, hydroxy, nitro or alkali metal sulfo or 2-furyl.

With respect to the $R_1$ in the above formula (I), the alkyl group may be exemplified by methyl, ethyl, propyl, butyl, as substituted alkyl groups, 2-hydroxyethyl, 2-ethoxyethyl, ethoxymethyl, 2-phenoxyethyl, 2-acetoxyethyl, 2-stearoyloxyethyl, 2-benzoyloxyethyl, 2-acryloyloxyethyl, 2-chloroethyl, 2-cyanoethyl, cyanomethyl, 2,3-epoxypropyl, ethoxycarbonylmethyl, butoxycarbonylmethyl, methoxycarbonylmethyl, 2-methoxycarbonylethyl, phenoxycarbonylmethyl; the alkenyl group by allyl or 2-butenyl; the alkynyl group by 2-propynyl or 2-butynyl; the phenylalkyl group by benzyl or phenethyl; the aliphatic acyl group by acetyl, propionyl, butyryl, acryloyl, methacryloyl or crotonyl; the alkoxycarbonyl group by ethoxycarbonyl or octoxycarbonyl; and the phenylalkoxycarbonyl group by benzyloxycarbonyl.

With respect to the $R_2$ in the above formula (I), the alkyl group may be exemplified by methyl, ethyl, propyl, isopropyl, butyl or isobutyl; the phenylalkyl by benzyl or phenethyl; the aryl group by phenyl, α- or β-naphthyl, or a phenyl which may be optionally substituted with bromine, chlorine, hydroxy, nitro, methyl, methoxy or sodium sulfo.

With respect to the $R_3$, when $n$ is 1, in the above formula (I), the alkyl group may be exemplified by methyl, ethyl, propyl, isopropyl, butyl, isobutyl, t-butyl, pentyl, 1-ethylpentyl, hexyl, heptyl, actyl, dodecyl, tridodecyl, pentadecyl or heptadecyl; the halogenoalkyl group by chloromethyl, bromomethyl or 2-chloroethyl; the alkenyl group by vinyl, 1-propenyl, 2-methyl-1-propenyl or 1-butenyl; the alkynyl group by ethynyl or 1-propynyl; the phenyl-alkyl group by benzyl or phenethyl; the aryl group are the same as exemplified with regard to the above-mentioned aryl group of $R_2$; the heterocyclic group by 2-furyl or 2-thienyl; and the cycloalkylidene group jointly formed from $R_3$ and $R_2$ by cyclobutylidene, cycloheptylidene or cyclohexylidene. And with respect to the $R_3$, when $n$ is 2, in the above formula (I), the alkylene group may be exemplified by ethylene, propylene, trimethylene or tetramethylene and the phenylene group by p-phenylene or m-phenylene.

The term "synthetic polymer" as used in this invention is contemplated to include polyolefin including low- and high-density polyethylene, polypropylene, polystyrene, polybutadiene, polyisoprene, other olefin homopolymer and ethylene-propylene copolymer, ethylene-butene copolymer, ethylene-vinyl acetate copolymer, styrene-butadiene copolymer, acrylonitrile-styrene-butadiene copolymer, other copolymers of other ethylene-forming unsaturated monomer and olefin;

polyvinyl chloride and polyvinylidene chloride including homopolymers of vinyl chloride and vinylidene chloride, respectively, copolymers of vinyl chloride with vinylidene chloride, copolymers of each of vinyl chloride and vinylidene chloride with vinyl acetate or other ethylene-forming unsaturated monomer;

polyacetal, for example, polyoxymethylene and polyoxyethylene;

polyester, for example, polyethylene terephthalate;

polyamide, for example, 6-nylon, 6,6-nylon and 6,10-nylon, polyurethane and epoxy resin.

The synthetic polymeric materials are widely utilized in the form of various shapes, e.g., fibres, films, sheets, other molded products, latex and foams, because of their excellent properties.

Representative compounds of the piperidine derivatives (I) of this invention are illustrated below, but the compounds illustrated hereunder are not intended to limit this invention. The numbers appended to the compounds will be used to identify some of them hereinafter.

1. 4-benzylideneamino-2,2,6,6-tetramethylpiperidine
2. 4-cinnamylideneamino-2,2,6,6-tetramethylpiperidine
3. 4-(2-chlorobenzylideneamino)-2,2,6,6-tetramethylpiperidine
4. 4-(4-nitrobenzylideneamino)-2,2,6,6-tetramethylpiperidine
5. 4-(2-sodiumsulfobenzylideneamino)-2,2,6,6-tetramethylpiperidine
6. 4-(4-methoxybenzylideneamino)-2,2,6,6-tetramethylpiperidine
7. 4-salicylideneamino-2,2,6,6-tetramethylpiperidine
8. 4-butylideneamino-2,2,6,6-tetramethylpiperidine
9. 4-isobutylideneamino-2,2,6,6-tetramethylpiperidine
10. 4-(2-ethyl-hexylideneamino)-2,2,6,6-tetramethylpiperidine
11. 4-(2-butenylideneamino)-2,2,6,6-tetramethylpiperidine
12. 4-furfurylideneamino-2,2,6,6-tetramethylpiperidine
13. 4-(1-benzyl-phenethylideneamino)-2,2,6,6-tetramethylpiperidine
14. 4-(1-methyl-benzylideneamino)-2,2,6,6-tetramethylpiperidine
15. 4-benzhydrylideneamino-2,2,6,6-tetramethylpiperidine
16. 4-[1-(α-naphthyl)ethylidene]amino-2,2,6,6-tetramethylpiperidine
17. 4-cyclohexylideneamino-2,2,6,6-tetramethylpiperidine
18. 4-benzylideneamino-1,2,2,6,6-pentamethylpiperidine
19. 4-(4-methylbenzylideneamino)-1,2,2,6,6-pentamethylpiperidine
20. 4-tridecylideneamino-1,2,2,6,6-pentamethylpiperidine
21. 4-(2-butenylideneamino)-1,2,2,6,6-pentamethylpiperidine
22. 4-(1,3-dimethyl-2-butenylideneamino)-1,2,2,6,6-pentamethylpiperidine
23. 4-benzhydrylideneamino-1,2,2,6,6-pentamethylpiperidine
24. 4-(1-isobutyl-isopentylideneamino)-1,2,2,6,6-pentamethylpiperidine
25. 4-butylideneamino-1-octyl-2,2,6,6-tetramethylpiperidine
26. 4-benzylideneamino-1-ethoxycarbonyl-2,2,6,6-tertramethylpiperidine
27. 4-(2-ethyl-hexylideneamino)-1-acetyl-2,2,6,6-tetramethylpiperidine
28. 4-benzylideneamino-1-benzyl-2,2,6,6-tetramethylpiperidine
29. 1-allyl-4-cinnamylideneamino-2,2,6,6-tetramethylpiperidine
30. 4(1-chloromethyl-benzylideneamino)-1-(2-propynyl)-2,2,6,6-tetramethylpiperidine
31. 1,2-bis(2,2,6,6-tetramethyl-4-piperidylimino)ethane
32. α,α'-bis(2,2,6,6-tetramethyl-4-piperidylimino)-p-xylene The piperidine derivatives (I) of this invention can be readily obtained by condensing the 4-aminopiperidine derivatives (II) with an aldehyde or ketone as illustrated by the following reaction equation. The reaction may be effected in a suitable inert organic solvent at room temperature or with heating.

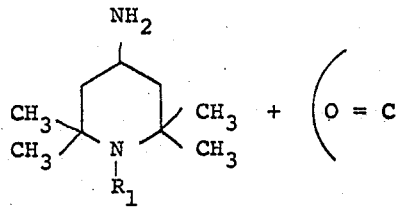 + 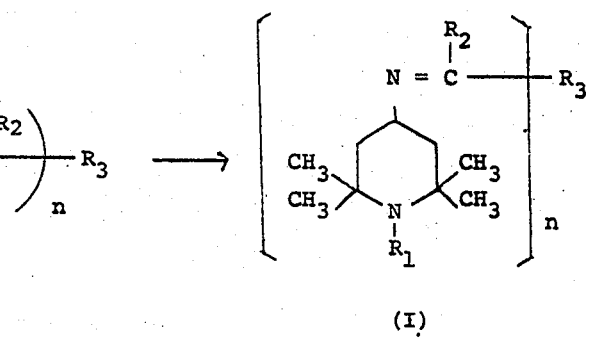

(II)                              (I)

In the above formulae, $R_1$, $R_2$, $R_3$ and $n$ are the same as set forth above.

In this invention, the piperidine derivatives (I) employed as a stabilizer may be easily incorporated into a symthetic polymeric material by various methods commonly used in the art. The stabilizer may be added to a synthetic polymeric material at any stage in the manufacture of a molded product therefrom. For example, the stabilizer in a dry powder form may be admixed with a synthetic polymeric material or a suspension or emulsion of the stabilizer may be admixed therewith.

The amount of the piperidine derivative (I) which may be added to a synthetic polymeric material according to this invention is varied upon the kind, nature and purpose for use of the synthetic polymeric material to be stabilized. In general, the amount ranging in 0.01 – 5% by weight may be employed to the weight of synthetic polymeric material, but a practical range may be varied upon the synthetic polymeric material and there may be used 0.01 – 2.0% by weight, desirably 0.02 – 1.0% by weight for polyolefin; 0.01 – 1.0% by weight, desirably 0.02 – 0.5% by weight for polyvinyl chloride and polyvinylidene chloride; 0.01 – 5.0% by weight, desirably 0.02 – 2.0% by weight for polyurethane and polyamide.

The above-mentioned stabilizer may be used alone or in admixture with other known additives such as antioxidants, ultraviolet absorbents, light protection agents, fillers, pigments and the like.

Examples of such additives are illustratively shown below.

ANTIOXIDANTS

Simple, 2,6-dialkylphenols, such as, for example, 2,6-di-tert.butyl-4-methylphenol, 2-tert.butyl-4,6-dimethylphenol, 2,6-di-tert.butyl-4-methoxymethylphenol and 2,6-dioctadecyl-4-methylphenol.

Derivatives of alkylated hydroquinones, such as, for example, 2,5-di-tert.butyl-hydroquinone, 2,5-di-tert.-amyl-hydroquinone, 2,6-di-tert.butyl-hydroquinone, 2,5-di-tert.butyl-4-hydroxyanisole, 3,5-di-tert.butyl-4-hydroxyanisole and tris(3,5-di-tert.butyl-4-hydroxyphenyl) phosphite, 3,5-di-tert.butyl-4-hydroxyphenyl-stearate, di-(3,5-di-tert.butyl-4-hydroxyphenyl)adipate.

Hydroxylated thiodiphenyl ethers, such as, for example, 2,2'-thiobis(6-tert.buryl-4methylphenyl), 2,2'-thiobis-(4-octylphenol), 4,4'-thiobis(6-tert.butyl-3-methylphenol), 4,4'-thiobis(3,6-di-sec.amylphenol), 4,4'-thiobis-(6-tert.butyl-2-methylphenol) and 4,4'-bis(2,6-dimethyl-4-hydroxyphenyl)disulfide.

Alkylidene-bisphenols, such as, for example, 2,2'-methylene-bis(6-tert.butyl-4-methylphenol),2,2'-methylene-bis(6-tert.butyl-4-ethylphenol), 4,4'-methylene-bis(6-tert.butyl-2-methylphenol), 4,4'-methylene-bis(2,6-di-tert.butylphenol), 2,6-di-(3-tert.butyl-5-methyl-2-hydroxybenzyl)-4-methylphenol, 2,2'-methylene-bis[4-methyl-6-(α-methylcyclohexyl)-phenol], 1,1-bis(3,5-dimethyl-2-hydroxyphenyl)-butane, 1,1-bis(5-tert.butyl-4-hydroxy-2-methylphenyl)-butane, 2,2-bis(5-tert.butyl-4-hydroxy-2-methylphenyl)butane, 2,2-bis(3,5-di-tert.butyl-4-hydroxyphenyl)propane, 1,1,3-tris-(5-tert.butyl-4-hydroxy-2-methylphenyl)butane, 2,2-bis(5-tert.butyl-4-hydroxy-2-methylphenyl)-4-n-dodecylmercaptobutane, 1,1,5,5-tetra(5-tert.butyl-4-hydroxy-2-methylphenyl)pentane and ethylene glycol bis-[3,3-bis(3'-tert.butyl-4'-hydroxyphenyl)butyrate].

O-, N- and S-benzyl compounds, such as, for example, 3,5,3', 5'-tetra-tert.butyl-4,4'-dihydroxydibenzylether, 4-hydroxy-3,5-dimethylbenzylmercaptoacetic acid octadecyl ester, tri(3,5-di-tert.butyl-4-hydroxybenzyl)amine, and bis(4-tert.butyl-3-hydroxy-2,6-dimethylbenzyl)dithiolterephthalate.

Hydroxybenzylated malonic esters, such as, for example, 2,2-bis(3,5-di-tert.butyl-2-hydroxybenzyl)malonic acid dioctadecyl ester, 2-(3-tert.butyl-4-hydroxy-5-methylbenzyl)malonic acid dioctadecyl ester, 2,2-bis(3,5-di-tert.butyl-4-hydroxybenzyl)malinic acid di-dodecylmercaptoethyl ester and 2,2-bis(3,5-di-tert.butyl-4-hydroxybenzyl)malonic acid di(4-tert.-octylphenyl)ester.

Hydroxybenzyl-aromatics, such as, for example, 1,3,-5-tri(3,5-di-tert.butyl-4-hydroxybenzyl)-2,4,6-trimethylbenzene, 1,4-di(3,5-di-tert.butyl-4-hydroxybenzyl)-2,3,5,6-tetramethylbenzene and 2,4,6-tri-(3,5-di-tert.butyl-4-hydroxybenzyl)phenol.

s-Triazine compounds, such as, for example, 2,4-bis-octylmercapto-6-(3,5-di-tert.butyl-4-hydroxyanilino)-s-triazine, 2-octylmercapto-4,6-bis(3,5-di-tert.-butyl-4-hydroxyanilino)-s-triazine, 2-octylmercapto-4,6-bis(3,5-di-tert.butyl-4-hydroxyphenoxy)-s-triazine, 2,4,6-tris(3,5-di-tert.butyl-4-hydroxyphenoxy)-s-triazine, 2,4,6-tris(3,5-di-tert.butyl-4-hydroxyphenylethyl)-s-triazine and 1,3,5-tris-(3,5-di-tert.butyl-4-hydroxybenzyl)isocyanurate.

Amides of 3,5-di-tert.butyl-4-hydroxyphenylpropionic acid, such as, for example, 1,3,5-tris(3,5-di-tert.butyl-4-hydroxyphenyl-propionyl)-hexahydro-s-triazine and N,N'-bis(3,5-di-tert.butyl-4-hydroxyphenylpropionyl)-hexamethylenediamine.

Esters of 3,5-di-tert.butyl-4-hydroxyphenylpropionic acid with monohydric or polyhydric alcohols, such as, for example, methanol, ethanol, octadecanol, 1,6-hexanediol; 1,9-nonanediol, ethylene glycol, 1,2-propanediol, diethylene glycol, thiodiethylene glycol, neopentyl glycol, pentaerythritol, 3-thia-undecanol, 3-thia-pentadecanol, trimethylhexanediol, trimethylolethane, trimethylolpropane, tris-hydroxyethylisocyanurate and 4-hydroxymethyl-1-phospha-2,6,7-trioxyabicyclo[2,2,2]octane.

Esters of 5-tert.butyl-4-hydroxy-3-methylphenylpropionic acid with monohydric or polyhydric alcohols, such as, for example, methanol, ethanol, octadecanol, 1,6-hexanediol, 1,9-nonanediol, ethylene glycol, 1,2-propanediol, diethylene glycol, thiodiethylene glyjcol, neopentyl glycol, pentaerythritol, 3-thiaundecanol, 3-thia-pentadecanol, trimethylhexanediol, trimethylolethane, trimethylolpropane, tris-hydroxyethylisocyanurate and 4-hydroxymethyl-1-phospha-2,6,7-trioxabicyclo[2,2,2]-octane.

Esters of 3,5-di-tert.butyl-4-hydroxyphenylacetic acid with monohydric or polyhydric alcohols, such as, for example, methanol, ethanol, octadecanol, 1,6-hexanediol, 1,9-nonanediol, ethylene glycol, 1,2-propanediol, diethylene glycol, thiodiethylene glycol, neopentyl glycol, pentaerythritol, 3-thia-undecanol, 3-thia-pentadecanol, trimethylhexanediol, trimethylolethane, trimethylolpropane, tris-hydroxyethylisocyanurate and 4-hydroxymethyl-1-phospha-2,6,7-tri-oxabicyclo[2,2,2]octane.

Acylaminophenols, such as, for example, N-(3,5-di-tert.butyl-4-hydroxyphenyl)stearic acid amide and N,-N'-bis(3,5-di-tert.butyl-4-hydroxyphenyl)-thio-bis-acetamide.

Benzylphosphonates, such as, for example, 3,5-di-tert.butyl-4-hydroxybenzylphosphonic acid dimethyl ester, 3,5-di-tert.butyl-4-hydroxybenzylphosphonic acid diethyl ester, 3,5-di-tert.butyl-4-hydroxybenzylphosphonic acid dioctadecyl ester and 5-tert.butyl-4-hydroxy-3-methylbenzylphosphonic acid dioctadecyl ester.

Aminoaryl derivatives, such as, for example, phenyl-1-naphthylamine, phenyl-2-naphthylamine, N,N'-diphenyl-p-phenylenediamine, N,N'-di-2-naphthyl-p-phenylenediamine, N,N'-di-sec.butyl-p- phenylenediamine, 6-ethoxy-2,2,4-trimethyl-1,2-dihydroquinoline, 6-dodecyl-2,2,4-trimethyl-1,2-dihydroquinoline, mono- and di-octyliminodibenzyl and polymeriaed 2,2,4-trimethyl-1,2-dihydroquinoline.

UV-absorbers and light protection agents 2-(2'-Hydroxyphenyl)-benztriazoles, such as, for example, the 5'-methyl-, 3',5'-di-tert.butyl-, 5'-tert.butyl-, 5'-(1,1,3,3-tetramethyl-butyl)-, 5-chloro-3',5'-di-tert.-butyl-, 5-chloro-3'-tert.butyl-5'-methyl-, 3'-sec.butyl-5'-tert.butyl-, 3'-[α-methylbenzyl]-5'-methyl-, 3'-[α-methylbenzyl]-5'-methyl-5-chloro-, 4'-hydroxy-, 4'-methoxy-, 4'-octoxy-, 3',5'-di-tert.amyl-, 3'-methyl-5'-carbomethoxyethyl- or 5-chloro-3',5'-di-tert.amyl- derivatives.

2,4-Bis(2'-hydroxyphenyl)-6-alkyl-s-triazines, such as, for example, the 6-ethyl-, 6-undecyl- or 6-heptadecyl- derivatives.

2-Hydroxy-benzophenones, such as, for example, the 4-hydroxy-, 4-methoxy-, 4-octoxy-, 4-decyloxy-, 4-dodecyloxy-, 4-benzyloxy-, 4,2'-4'-trihydroxy- or 2'-hydroxy-4,4'-dimethoxy-derivatives.

1,3-Bis(2'-hydroxy-benzoyl)benzenes, such as, for example, 1,3-bis(2'-hydroxy-4'-hexyloxy-benzoyl)benzene, 1,3-bis(2'-hydroxy-4'-octoxy-benzoyl)henzene and 1,3-bis(2'-hydroxy-4'-dodecyloxy-benzoyl)benzene.

Esters of optionally substituted benzoic acids, such as, for example, phenyl salicylate, octylphenyl, salicylate, di-benzoylresorcinol, bis(4-tert.butylbenzoyl) resorcinol, benzoyl-resorcinol, 3,5-di-tert.butyl-4-hydroxybenzoic acid 2,4-di-tert.butylphenyl ester, octadecyl ester or 2-methyl-4,6-di-tert.butylphenyl ester.

Acrylates, such as, for example, α-cyano-β,β-diphenylacrylic acid ethyl ester or isooctyl ester, α-carbomethoxycinnamic acid methyl ester, α-cynao-β-methyl-p-methoxycinnamic acid methyl ester or butyl ester and N-(β-carbomethoxy-vinyl)-2-methylindoline.

Nickel compounds, such as, for example, nickel complexes of 2,2'-thiobis(4-tert.octylphenol), such as the 1:1 and 1:2 complex, optionally with other ligands such as n-butylamine, triethanolamine or N-cyclohexyl-diethanolamine, nickel complexes of bis(4-tert.octylphenyl)sulphone, such as the 2:1 complex, optionally with other ligands such as 2-ethyl-caproic acid, nickel dibutyldithiocarbamate, nickel salts of 4-hydroxy-3,5-di-tert.butylbenzylphosphonic acid monoalkyl esters, such as the methyl, ethyl or butyl ester, the nickel complex of 2-hydroxy-4-methyl-phenyl-undecyl-ketonoxime and nickel 3,5-di-tert.butyl-4-hydroxybenzoate.

Oxalic acid diamides, such as, for example, 4,4'-di-octyloxyoxanilide, 2,2'-dioctyloxy-5,5'-di-tert.-butyloxanilide, 2,2'-di-dodecyloxy-5,5'-di-tert.-butyloxyanilide, 2-ethoxy-5-tert.butyl-2'-ethyloxanilide, 2-ethoxy-2'-ethyl-oxanilide, N,N'-bis-(3-dimethylaminopropyl)oxalamide, mixture of o- and p-methoxy and o- and p-ethoxy-di-substituted oxanilides and mixtures of 2-ethoxy-5-tert.butyl-2'-ethyloxanilide with 2-ethoxy-2'-ethyl-5,4'-di-tert.butyloxanilide.

Metal deactivators, such as, for example, oxanilide, isophthalic acid dihydrazine, sebacic acid, bis-phenylhydrazide, bis-benzylidene oxalic acid dihydrazide, N,N'-diacetyl-adipic acid dihydrazide, N,N'-bis-salicyloyl-oxalic acid dihydrazide, N,N'-bis-salicyloyl-hydrazine and N,N'-bis(3,5-di-tert.butyl-4-hydroxyphenyl-propionyl)hydrazine.

Phosphites, such as, for example, triphenylphosphite, di-phenyl alkyl-phosphites, phenyl dialkylphosphites, trinonylphenylphosphite, trilaurylphosphite, trioctadecylphosphite, 3,9-di-isodecyloxy-2,4,8,10-tetraoxa-3,9-diphospha-spiro[5.5]undecane and tris(4-hydroxy-3,5-di-tert.butylphenyl)phosphite.

Compounds which destroy peroxide, such as, for example, esters of β-thiodipropionic acid, e.g., the lauryl, stearyl, myristyl or tridecyl ester, salts of 2-mercaptobenzimidazole, e.g., the zinc salt, and diphenylthiourea.

Polyamide stabilizers, such as, for example, copper salts in combination with iodides and/or phosphorus compounds and salts of divalent manganes.

Basic co-stabilizers, such as, for example, polyvinylpyrrolidone, melamine, benzoguanamine, triallyl cyanurate, dicyandiamide, urea derivatives, hydrazine derivatives, amines, polyamides, polyurethanes and alkali metal salts and alkaline earth metal salts of higher saturated or unsaturated fatty acids, e.g., Ca stearate, Mg laurate, Na ricinoleate, K palmitate and Zn stearate.

PVC stabilizers, such as, for example, organic tin compounds, organic lead compounds and C./1 salts of fatty acids.

Nucleating agents, such as, for example, 4-tert.-butylbenzoic acid, adipic acid and diphenylacetic acid.

Other additives, such as, for example, plasticizers, lubricants, e.g., glycerine monostearate, emulsifiers, antistatic agents, flameproofing agents, pigments, carbon black, asbestos, glass fibres, kaolin and talc.

These other additives may be usually blended into a synthetic polymers at a ratio of 0.5–3 to the weight of the piperidine derivatives (I).

Examples 1 through 8 describe the synthetic polymeric material compositions having incorporated therein the piperidine derivative(I) and their stabilizing effects and Referential Examples 1–3 describe the preparation of the piperidine derivative (I).

EXAMPLE 1

Into 100 parts of polypropylene [prepared by twice recrystallization of "Noblen JHH-G", trade name of Mitsui Toatsu Chemicals Inc., from monochlorobenzene] was incorporated 0.25 part of the stabilizing compound of this invention. The resulting mixture was blended and molten. The molten was molded into a sheet with a thickness of 0.5 mm. under heating and pressure.

The sheet was exposed to irradiation of ultraviolet ray at 45°C. in a Fade-Meter and the time when the sheet would become brittle was measured.

The results are shown in Table 1.

Table 1

| Stabilizing compound No. | Polypropylene | High-density polyethylene |
|---|---|---|
| 1 | 660 | 1120 |
| 2 | 720 | 1180 |
| 3 | 500 | 1020 |
| 4 | 480 | 880 |
| 5 | 420 | 700 |
| 7 | 600 | 1140 |
| 8 | 520 | 940 |
| 9 | 440 | 800 |
| 10 | 580 | 1020 |
| 11 | 700 | 1260 |
| 12 | 460 | 900 |
| 13 | 680 | 1040 |
| 14 | 620 | 960 |
| 15 | 560 | 860 |
| 16 | 460 | 680 |
| 18 | 660 | 1080 |

TABLE 1—Continued

| Stabilizing compound No. | Polypropylene | High-density polyethylene |
| --- | --- | --- |
| 21 | 380 | 720 |
| 23 | 520 | 960 |
| 31 | 460 | 760 |
| None | 60 | 400 |

EXAMPLE 2

Into 100 parts of high-density polyethylene [prepared by twice recrystallization of "Hi-Zex", trade name of Mitsui Toatsu Chemicals Inc., from tolene] was incorporated 0.25 part of the stabilizing compound of this invention. The resulting mixture was blended and molten and molded into a sheet with a thickness of 0.5 mm. under heating and pressure.

The sheet was exposed to irradiation of ultraviolet ray at 45°C. in a Fade-Meter and the time when the sheet would become brittle was measured.

The results are given in Table 1.

EXAMPLE 3

Into 100 parts of polystyrene [prepared by twice recrystallization of "Styrone", trade name of AsahiDow Limited, from a mixture of benzene with methanol] was incorporated 0.25 part of the stabilizing compounds of this inventin. The resulting mixture was molded at 180°C. under pressure into a plate with a thickness of 1 mm.

The plate thus formed was subjected to the exposure of ultraviolet ray irradiation in a Fade-Meter at 45°C. for 500 hours. A test piece of the treated plate was tested for color difference by means of a color-difference colorimeter according to the method prescribed in Japanese Industrial Standard "K-7103", and a change of the yellowness index of the plate was calculated according to the following equation:

$$\Delta YI = YI - YI_0$$

wherein $\Delta YI$ means a change of yellowness index, $YI$ means a yellowness index after exposure and $YI_0$ means an initial yellowness index of a test piece.

The results are shown in Table 2.

Table 2

| Stabilizing compound No. | $YI_0$ | $\Delta YI$ |
| --- | --- | --- |
| 1 | 2.4 | +2.3 |
| 11 | 2.5 | +3.0 |
| 14 | 2.1 | +2.7 |
| 18 | 2.0 | +1.6 |
| None | 2.9 | +9.4 |

EXAMPLE 4

Into 100 parts of ABS resin ["Kane Ace B-12", trade name, available from Kanegafuchi Spinning Co., Ltd.] was incorporated 0.5 part of the stabilizing compound of this invention, the resulting mixture was kneaded on a kneading roll at 160°C. for 6 minutes and then molded into a sheet with a thickness of about 0.5 mm.

The sheet was treated in a sunshine weather-ometer for 50 hours and tested for retentions of ultimate elongation and of ultimate tensile strength as well as coloration degree were determined. The results are shown in Table 3.

Table 3

| Stabilizing compound No. | Retention of elongation | Retention of tensile strength |
| --- | --- | --- |
| 1 | 65% | 71% |
| 11 | 68 | 71 |
| 14 | 75 | 78 |
| 18 | 72 | 82 |
| None | 55 | 76 |

EXAMPLE 5

Into 100 parts of 6-nylon ["CM 1011", trade name, available from Toray Industries Inc.] was incorporated 0.25 part of the stabilizing compound of this invention. The resulting mixture was heated and melted and then molded into a film having a thickness of about 0.1 mm. under pressure by a conventional compression molding machine. The film thus formed was aged under the following aging condition and thereafter subjected to a tensile test to determine the retentions of tensile strength and elongation by a standard method.

Aging conditions
1. Exposure to ultraviolet ray for 200 hours in a Fade-Meter at 45°C.
2. Aging at 160°C. for 2 hours in a Geer's aging tester.

The results are shown in Table 4.

Table 4

| Stabilizing compound No. | Fade-Meter | | Geer's aging tester | |
| --- | --- | --- | --- | --- |
| | Retention of ultimate elongation | Retention of ultimate tensile strength | Retention of ultimate elongation | Retention of ultimate tensile strength |
| 1 | 70% | 78% | 61% | 63% |
| 11 | 67 | 76 | 65 | 68 |
| 14 | 73 | 70 | 68 | 65 |
| 18 | 65 | 68 | 60 | 62 |
| None | 26 | 55 | 25 | 56 |

EXAMPLE 6

Into 100 parts of polycaprolactone type polyurethane ["E-5080", trade name, available from The Nippon Elastollan Industries Ltd.] was incorporated 0.5 part of the stabilizing compound of this invention. The resulting mixture was heated and melted and then molded into a sheet having a thickness of about 0.5 mm. The sheet thus formed was subjected to the exposure to ultraviolet ray in a Fade-Meter at 45°C. for 15 hours and then tested for the retentions of ultimate elongation and ultimate tensile strength.

The results are shown in Table 5.

Table 5

| Stabilizing compound No. | Retention of ultimate elongation | Retention of ultimate tensile strength |
| --- | --- | --- |
| 1 | 83% | 77% |
| 11 | 80 | 71 |
| 14 | 91 | 85 |
| 18 | 88 | 84 |
| None | 72 | 49 |

EXAMPLE 7

Into 100 parts of polyvinyl chloride [ "Geon 103EP" trade name, available from The Japanese Geon Co., Ltd.] were incorporated 3 parts of butyl tin maleate, 0.5 part of butyl stearate and 0.25 part of the stabilizing compound of this invention and the resulting mixture was kneaded for 5 minutes on a kneading roll at 180°C. and formed into a sheet with a thickness of 0.5 mm. The sheet was observed on its discoloration by means of the aging testers as shown below.
1. Sunshine weather for 200 hours
2. Aging under heating in Geer's heating aging tester at 160°C. for 30 minutes.

The results are shown in Table 6.

Table 6

| Stabilizing compound No. | Weather meter | Geer's aging tester |
| --- | --- | --- |
| 1 | pale brown | pale reddish brown |
| 11 | do. | do. |
| 14 | do. | do. |
| 18 | do. | do. |
| None | Brown | reddish brown |

EXAMPLE 8

Into 100 parts of polyester resin ["Ester-G13", trade name, available from Mitsui Toatsu Chemicals, Inc.] were incorporated 1 part of benzoyl peroxide and 0.2 part of the stabilizing compound of this invention. The resulting mixture was cured by pre-heating at 60°C. for 30 minutes and then heating at 100°C. for additional 1 hour to be formed into a plate with a thickness of 3 mm.

The plate thus formed was exposed to irradiation in the sunshine weather-ometer for 60 hours and the change of yellowness index thereof was determined according to the same method as described in the above Example 3.

The results are shown in Table 7.

Table 7

| Stabilizing compound No. | $YI_0$ | YI |
| --- | --- | --- |
| 1 | 2.1 | +6.3 |
| 11 | 2.4 | +7.5 |
| 14 | 2.4 | +7.2 |
| 18 | 2.5 | +8.0 |
| None | 2.3 | +14.6 |

REFERENTIAL EXAMPLE 1

4-Benzylideneamino-2,2,6,6-tetramethylpiperidine

In 50 ml. of ethanol is dissolved 7.8 g. of 4-amino-2,2,6,6-tetramethylpiperidine and 5.3 g. of benzaldehyde is added thereto. The mixture is allowed to stand at room temperature overnight. The ethanol is distilled off. The resulting crude crystals are dissolved in 50 ml. of n-hexane with heating, insolubles are filtered off and after cooling the end product is obtained as white crystals. m.p. 70°C.

Analysis for $C_{16}H_{24}N_2$:
Calculated: C,78.64%; H,9.90%; N,11.46%
Found: C,78.52%; H,9.93%; N,11.61%

REFERENTIAL EXAMPLE 2

4-Benzylideneamino-1,2,2,6,6-pentamethylpiperidine

In 20 ml. of ethanol is dissolved 20 g. of 4-amino-1,2,2,6,6-pentamethylpiperidine and 1.4 g. of benzaldehyde is added thereto. The mixture is left overnight. The ethanol is distilled off and the resulting crude crystals are recrystallized from 10 ml. of 50% ethanol to give the end product as white crystals. m.p. 71.5°C.

Analysis for $C_{17}H_{26}N_2$:
Calculated: C,79.02%; H,10.14%; N,10.84%
Found: C,78.80%; H,10.11%; N,10.88%

REFERENTIAL EXAMPLE 3

4-Benzhydrylideneamino-2,2,6,6-tetramethylpiperidine

In 60 ml. of toluene is dissolved 20.3 g. of 4-amino-2,2,6,6-tetramethylpiperidine and 23.7 g. of benzophenone and 0.5 g. of zinc chloride are added thereto. After refluxing for 2 hours, azeotropic dehydration is effected for about 2.5 hours. The toluene is distilled off to give 44.2 g. of crude crystals. The crystals are dissolved in n-hexane with heating, insolubles are removed and, after cooling, the end product is obtained as white crystals. m.p. 83.3°C.

Analysis for $C_{22}H_{28}N_2$:
Calculated: C,82.45%; H,8.81%; N,8.14%
Found: C,82.19%; H,9.05%; N,8.23%

In accordance with the methods of the Referential Examples 1-3 were synthesized the following compounds.

4-cinnamylideneamino-2,2,6,6-tetramethylpiperidine m.p. 94.0°C.
4-(2-chlorobenzylideneamino)-2,2,6,6-tetramethylpiperidine m.p. 48°C.
4-(4-nitrobenzylideneamino)-2,2,6,6-tetramethylpiperidine m.p. 101.5°C.
4-(2-sodium sulfobenzylideneamino)-2,2,6,6-tetramethylpiperidine m.p. 105.0°C.
4-furfurylideneamino-2,2,6,6-tetramethylpiperidine m.p. 99.2°C.
4-(2-butenylideneamino)-2,2,6,6-tetramethylpiperidine m.p. 76.5°C.
4-(1-benzyl-phenethylideneamino)-2,2,6,6-tetramethylpiperidine b.p. 175°C./1 nnHg.
4-(1-methyl-benzylideneamino)-2,2,6,6-tetramethylpiperidine m.p. 40.0°C.
4-[1-(α-naphthyl)ethylideneamino]-2,2,6,6-tetramethylpiperidine b.p. 175°C./1 mmHg.
4-butylideneamino12,2,6,6-tetramethylpiperidine b.p. 87°C./3 mmHg.
4-isobutylideneamino-2,2,6,6-tetramethylpiperidine b.p. 78°C./3mmHg.
4-salicylideneamino-2,2,6,6-tetramethylpiperidine m.p. 127°C.
4-(2-ethyl-hexylideneamino)-2,2,6,6-tetramethylpiperidine b.p. 120°C./3 mmHg.
4-(2-butenylideneamino)-1,2,2,6,6-pentamethylpiperidine m.p. 77.5°C.
4-benzhydrylideneamino-1,2,2,6,6-pentamethylpiperidine m.p. 113.5°C.
1,2-bis(2,2,6,6-tetramethyl-4-piperidylimino)ethane m.p. 161.5°C

What is claimed is:

1. A synthetic polymer composition stabilized against photo- and thermal-deterioration wherein there is incorporated, in a sufficient amount to prevent said deterioration, a compound having the formula

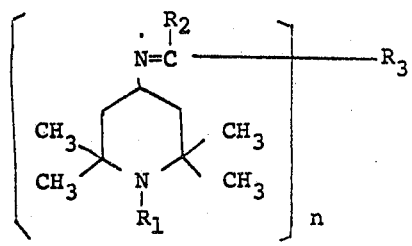

wherein $R_1$ represents hydrogen atom; and alkyl group having 1-4 carbon atoms which may be optionally substituted with hydroxy, alkoxy having 1-4 carbon atoms, phenoxy, aliphatic acyloxy having 2-18 carbon atoms, aromatic acyloxy having 7-11 carbon atoms, halogen, cyano, epoxy, alkoxycarbonyl having 1-4 carbon atoms in the alkoxy moiety or phenoxycarbonyl; an alkenyl group having 3-4 carbon atoms; an alkynyl group having 3-4 carbon atoms; benzyl group; an aliphatic acyl group having 2-4 carbon atoms; an alkoxycarbonyl gorup having 2-9 carbon atoms or a phenylalkoxycarbonyl group having 1-4 carbon atoms in the alkoxy moiety; $n$ is 1 or 2 and, when $n$ is 1, $R_2$ represents hydrogen atom; an alkyl group having 1-4 carbon atoms; a phenylalkyl group having 1-4 carbon atoms in the alkyl moiety; or an aryl group which may be optionally substituted with halogen, hydroxy, nitro, alkyl having 1-4 carbon atoms, alkoxy having 1-4 carbon atoms or alkali metal sulfo; and $R_3$ represents an alkyl group having 1-18 carbon atoms; a halogenoalkyl group having 1-4 carbon atoms; an alkenyl group having 2-4 carbon atoms; an alkynyl group having 2-4 carbon atoms; a phenylalkyl group having 1-4 carbon atoms in the alkyl moiety; styryl group; an aryl group which may be optionally substituted with halogen, hydroxy, nitro, alkyl having 1-4 carbon atoms, alkoxy having 1-4 carbon atoms, alkali metal sulfo; a heterocyclic group; or $R_3$ and $R_2$, together with the carbon atom to which they are attached, represent a cycloalkylidene group having 4-6 carbon atoms and, when $n$ is 2, $R_2$ represents hydrogen atom and $R_3$ represents an alkylene group having 2-6 carbon atoms; or phenylene; or the carbon atoms, each of which is linked to $R_3$, are directly bonded.

2. The synthetic polymer composition according to claim 1 wherein said compound is the compound having the above formula wherein $R_1$ represents hydrogen atom or an alkyl group having 1-4 carbon atoms, $n$ is 1 or 2 and, when $n$ is 1, $R_2$ represents hydrogen atom, an alkyl group having 1-4 carbon atoms, a phenylalkyl group having 1-4 carbon atoms in the alkyl moiety or phenyl group and $R_3$ represents an alkyl group having 1-18 carbon atoms, an alkenyl group having 2-4 carbon atoms, a phenylalkyl group having 1-4 carbon atoms in the alkyl moiety, styryl group, a phenyl or naphthyl group which may be optionally substituted with halogen, hydroxy, nitro or alkali metal sulfo or 2-furyl group and, when $n$ is 2, $R_2$ represents hydrogen atom and the carbon atoms, each of which is linked to $R_3$, are directly bonded.

3. The synthetic polymer composition according to claim 1 wherein said compound is the compound having the above formula wherein $R_1$ represents hydrogen atom or methyl group, $n$ is 1, $R_2$ represents hydrogen atom, an alkyl group having 1-4 carbon atoms, a phenylalkyl group having 1-4 carbon atoms in the alkyl moiety or phenyl group and $R_3$ represents an alkyl group having 1-18 carbon atoms, an alkenyl group having 2-4 carbon atoms, a phenylalkyl group having 1-4 carbon atoms in the alkyl moiety, styryl group, a phenyl or naphthyl group which may be optionally substituted with halogen, hydroxy, nitro or alkali metal sulfo or 2-furyl group.

4. The synthetic polymer composition according to claim 1 wherein said compound is selected from the group consisting of
4-benzylideneamino-2,2,6,6-tetramethylpiperidine,
4-(2-butenylideneamino)-2,2,6,6-tetramethylpiperidine,
4-(1-methylbenzylideneamino)-2,2,6,6-tetramethylpiperidine,
4-benzhydrylideneamino-2,2,6,6-tetramethylpiperidine, 4-benzylideneamino-1,2,2,6,6-pentamethylpiperidine,
4-(2-butenylideneamino)-1,2,2,6,6-pentamethylpiperidine,
4-benzhydrylideneamino-1,2,2,6,6-pentamethylpiperidine
and
1,2-bis(2,2,6,6-tetramethyl-4-piperidylimino)ethane.

5. The synthetic polymer composition according to claim 1 wherein said compound is incorporated in an amount of 0.01-5.0% by weight, based upon the amount of the synthetic polymer.

6. The synthetic polymer composition according to claim 1 wherein said polymer is a polyolefin.

7. The synthetic polymer composition according to claim 1 wherein said polymer is a polyvinyl chloride.

8. The synthetic polymer composition according to claim 1 wherein said polymer is a polyurethane.

9. The synthetic poplymer composition according to claim 1 wherein said polymer is a polyamide.

10. The synthetic polymer composition according to claim 1 wherein said polymer is a polyester.

11. The synthetic polymer composition according to claim 1 wherein said polymer is a polyurethane.

12. A syntehtic polymer composition stabilized against photo- and thermal-deterioration wherein there is incorporated, in a sufficient amount to prevent said deterioration, 4-benzylideneamino-2,2,6,6-tetramethylpiperidine, 4-(1-methylbenzylideneamino)-2,2,6,6-tetramethylpiperidine or 4-benzylideneamino-1,2,2,6,6-pentamethylpiperidine.

13. The synthetic polymer composition according to claim 12 wherein said compound is incorporated in an amount of 0.01-5.0% by weight, based upon the amount of the synthetic polymer.

14. The synthetic polymer composition according to claim 12 wherein said polymer is a polyolefin.

15. The synthetic polymer composition according to claim 12 wherein said polymer is a polyvinyl chloride.

16. The synthetic polymer composition according to claim 12 wherein said polymer is a polyamide.

17. The synthetic polymer composition according to claim 12 wherein said polymer is a polyester.

* * * * *